United States Patent
Kelly

(10) Patent No.: US 7,413,620 B2
(45) Date of Patent: Aug. 19, 2008

(54) ELECTRON BEAM WELDING TO JOIN GAMMA TITANIUM ALUMINIDE ARTICLES

(75) Inventor: Thomas Joseph Kelly, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 794 days.

(21) Appl. No.: 10/301,767

(22) Filed: Nov. 20, 2002

(65) Prior Publication Data

US 2004/0094246 A1 May 20, 2004

(51) Int. Cl.
*C22F 1/18* (2006.01)
(52) U.S. Cl. ................................. 148/524; 148/669
(58) Field of Classification Search ................ 148/524, 148/525, 535
See application file for complete search history.

(56) References Cited

U.S. PATENT DOCUMENTS

| 4,030,848 | A | * | 6/1977 | Keifert et al. ............... 403/272 |
| 4,409,462 | A | * | 10/1983 | Jahnke ................... 219/121.14 |
| 5,016,810 | A | * | 5/1991 | Sikka ......................... 228/206 |
| 5,413,876 | A | * | 5/1995 | Santella et al. .............. 428/680 |
| 5,598,762 | A | * | 2/1997 | Sneddon ...................... 92/192 |
| 5,724,816 | A | * | 3/1998 | Ritter et al. .................... 60/752 |
| 5,785,775 | A | | 7/1998 | Smashey et al. |
| 5,873,703 | A | | 2/1999 | Kelly et al. |
| 6,218,026 | B1 | | 4/2001 | Ewing et al. |
| 6,291,086 | B1 | * | 9/2001 | Nguyen-Dinh .............. 428/660 |
| 6,596,411 | B2 | * | 7/2003 | Feng et al. ................... 428/637 |

FOREIGN PATENT DOCUMENTS

RU        826756 A1  * 12/1993

* cited by examiner

*Primary Examiner*—George Wyszomierski
(74) *Attorney, Agent, or Firm*—McNees, Wallace & Nurlick, LLC

(57) ABSTRACT

A method is provided for welding two gamma titanium aluminide articles together. The method includes preheating the two articles to a welding temperature of from about 1700° F. to about 2100° F., thereafter electron beam welding the two articles together at the welding temperature and in a welding vacuum to form a welded structure, and thereafter annealing the welded structure at an annealing temperature of from about 1800° F. to about 2200° F., to form a joined structure.

17 Claims, 2 Drawing Sheets

ELECTRON BEAM WELDING TO JOIN GAMMA TITANIUM ALUMINIDE ARTICLES

The government has rights in this invention pursuant to contract number NAS3-26385, awarded by NASA.

This invention relates to the joining of two articles made of gamma titanium aluminide, and more particularly to welding the two articles together by electron beam welding.

BACKGROUND OF THE INVENTION

Titanium aluminides are a class of alloys whose compositions include at least titanium and aluminum, and typically some additional alloying elements such as chromium, niobium, vanadium, tantalum, manganese, and/or boron. The gamma titanium aluminides are based on the gamma phase found at nearly the equiatomic composition, with roughly 50 atomic percent each of titanium and aluminum, or slightly reduced amounts to permit the use of other alloying elements. The titanium aluminides, and particularly the gamma titanium aluminides, have the advantages of low density, high stiffness, good low- and intermediate-temperature strength and cyclic deformation resistance, and good environmental resistance.

Gamma titanium aluminides can be used in aircraft engines. They potentially have applications such as exhaust nozzle flaps, diffusers, low pressure turbine brush seal supports, bearing supports, compressor casings, high pressure and low pressure hangars, frames, and low-pressure turbine blades and vanes. They may also have application in other products such as automotive valves and superchargers.

Articles made of gamma titanium aluminide alloys are usually cast from the melt into a mold, with investment casting being the most popular approach, and then further processed. If the article being fabricated is complexly shaped or too large in size to be cast as a single piece, it may be necessary to cast two or more pieces and then weld the pieces together. However, while operable procedures are available for performing surface welding of cast gamma titanium aluminide articles to repair casting surface defects, there is no technique available for joining two or more large, rigid, structural gamma titanium aluminide articles together by welding.

There exists a need for a method for joining pieces of gamma titanium aluminides together. The present invention fulfills this need, and further provides related advantages.

BRIEF SUMMARY OF THE INVENTION

The present invention provides a method for joining together two articles, each made of a gamma titanium aluminide material. The technique allows deep penetration welding of the articles required for joining, and is not limited to surface welding to repair surface defects. The approach is operable to join commercial-sized articles, such as two or more articles that, when welded together, are a component of a gas turbine engine.

A method for performing deep-penetration welding of gamma titanium aluminide articles comprises the steps of providing two articles, each made of gamma titanium aluminide material, thereafter preheating the two articles to a welding temperature of from about 1700° F. to about 2100° F., preferably in a preheating vacuum, thereafter electron beam welding the two articles together at the welding temperature and in a welding vacuum to form a welded structure, and thereafter annealing the welded structure at an annealing temperature of from about 1800° F. to about 2200° F., preferably in a vacuum, to form a joined structure.

The welding temperature is preferably about 1800° F., and the annealing temperature is preferably about 2000° F. The preheating is preferably for a time sufficient to equilibrate the temperature throughout the two articles, and will therefore depend upon the sizes of the articles. The annealing time is sufficient to equilibrate the temperature throughout the article, followed by sufficient time to anneal the structure. The annealing time is preferably at least about 1 hour, is more preferably at least about 4 hours, and is most preferably from about 1 to about 6 hours.

In the preferred approach, a preheating device such as an oven is provided inside an electron beam vacuum chamber. In the preheating step, the two articles are placed in the preheating device at room temperature, and the electron beam vacuum chamber is evacuated to a preheating vacuum, prior to any heating of the two articles to the welding temperature. The two articles are thereafter heated from room temperature to the welding temperature.

In a commercial application, one of the two articles is at least about 0.5 inch thick, and it is electron beam welded through its entire thickness. "Deep-penetration welding" involves a weldment that extends a substantial distance into at least one of the articles, typically at least about 0.3 inch, more preferably at least about 0.5 inch, and most preferably at least about 1 inch. Surface welding, usually utilized in repair of surface cracks or casting defects, and welding of thin strip-like pieces involves shallower penetration and may be accomplished by other techniques.

The present approach provides a reliable technique for welding two gamma titanium aluminide articles together. It may be used with any size of articles, and allows welding through the entire thickness of at least one of the articles. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
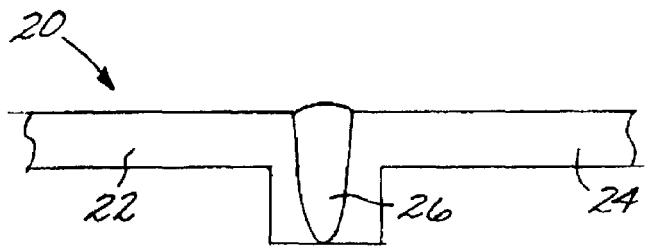
FIG. 1 is a schematic elevational view of two articles joined together to make a joined structure.

FIG. 1 illustrates a joined structure 20 that is fabricated by joining together two articles 22 and 24 at a weldment 26. (The present approach may also be extended to the joining of more than two articles.) Desirably, at least one of the articles 22 and 24 is at least about 0.5 inch thick, more preferably at least about 1 inch thick, in the area where the articles 22 and 24 are to be joined. At least one of the articles 22 and 24, and preferably both of the articles 22 and 24, are preferably large, rigid structural pieces. In this case, the joined structure 20 is an exhaust nozzle flap of a gas turbine engine, and the two articles 22 and 24 are two sections of the exhaust nozzle flap, each with a thick flange area where the two are welded together. Each of the articles 22 and 24, and thence the joined structure 20, is made of a gamma titanium aluminide material, but not necessarily the same gamma titanium aluminide material.

FIG. 1 shows one type of structure used in a gas turbine engine that may be fabricated by the present approach. Others include, for example, diffusers, low pressure turbine brush seal supports, bearing supports, compressor casings, high pressure and low pressure hangars, and frames.

As used herein, "gamma titanium aluminide" articles are those having compositions capable of forming the gamma (γ) titanium aluminide phase found generally at, slightly below, and slightly above the equiatomic composition in the titanium-aluminum system and in titanium-aluminum-X systems. (All compositions herein are stated in atomic percent unless indicated to the contrary.) Although the composition is based upon the titanium-aluminum system, alloying additions X (such as chromium and niobium) are provided in some gamma titanium aluminide alloys to modify and improve the properties for specific applications. The gamma titanium aluminide alloys of most interest are multiphase alloys comprising predominantly gamma phase, but which contain other phases such as alpha-two (α2) and/or beta-two (β2) phases. The most preferred alloys have from about 42 to about 49 atomic percent aluminum, balance titanium and, optionally, other alloying elements X. However, the gamma phase field extends up to about 70 atomic percent aluminum, and such alloys are also considered gamma titanium aluminides.

Examples of compositions of operable gamma titanium aluminide alloys for use with the present invention include alloys having nominal compositions, in atomic percent, of 48 percent aluminum, 2 percent chromium, 2 percent niobium, balance titanium and minor amounts of impurities totaling 100 atomic percent (known as "Ti-48Al-2Cr-2Nb"); 48 percent aluminum, 2 percent manganese, 2 percent niobium, balance titanium and minor amounts of impurities totaling 100 atomic percent; 48 percent aluminum, 2 percent manganese, 2 percent niobium, balance titanium and minor amounts of impurities totaling 100 atomic percent, plus 0.8 volume percent titanium diboride ($TiB_2$); 47 percent aluminum, 5 percent niobium, 1 percent tungsten, balance titanium and minor amounts of impurities totaling 100 atomic percent; and 47 percent aluminum, 1 percent manganese, 2 percent niobium, balance titanium and minor amounts of impurities totaling 100 atomic percent. These compositions are provided as examples, and the use of the present approach is not limited to these material compositions.

According to conventional processing, the articles 22 and 24 that are subsequently joined together are first individually cast from molten metal into a mold, typically an investment casting mold. The cast article is cooled to ambient temperature.

Figure 2:
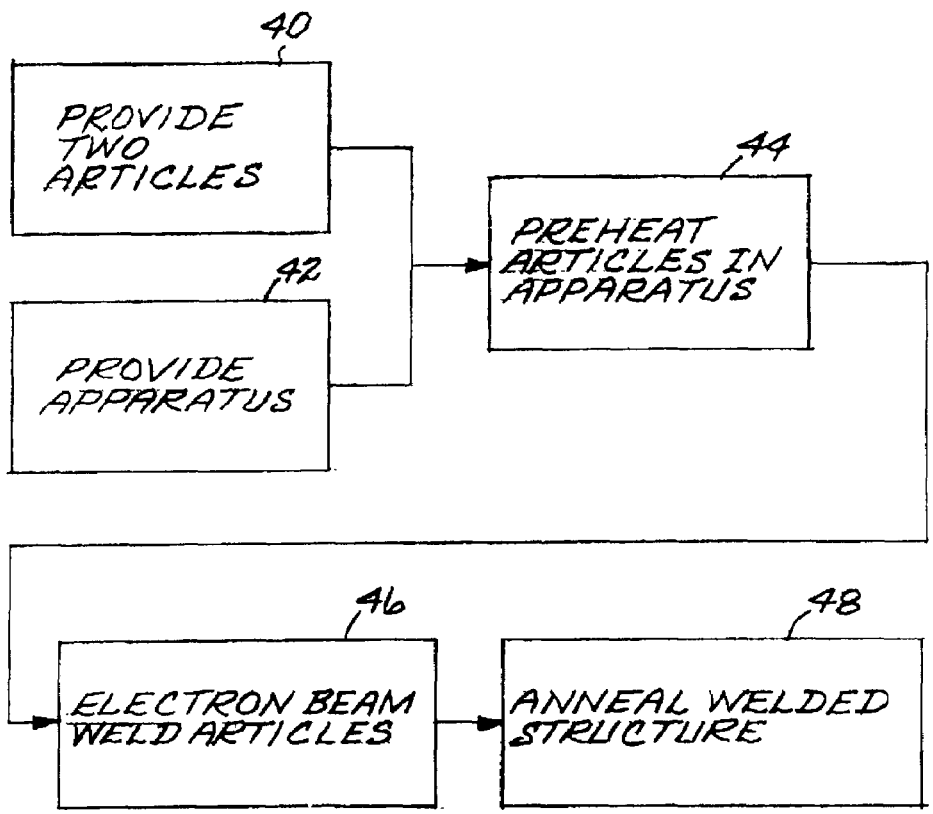
FIG. 2 is a block flow diagram of an approach for welding two articles together.

FIG. 2 depicts a preferred approach for practicing the present invention. The two articles 22 and 24 are provided, step 40. The two articles 22 and 24 and provided in an unjoined, separated form.

Figure 3:
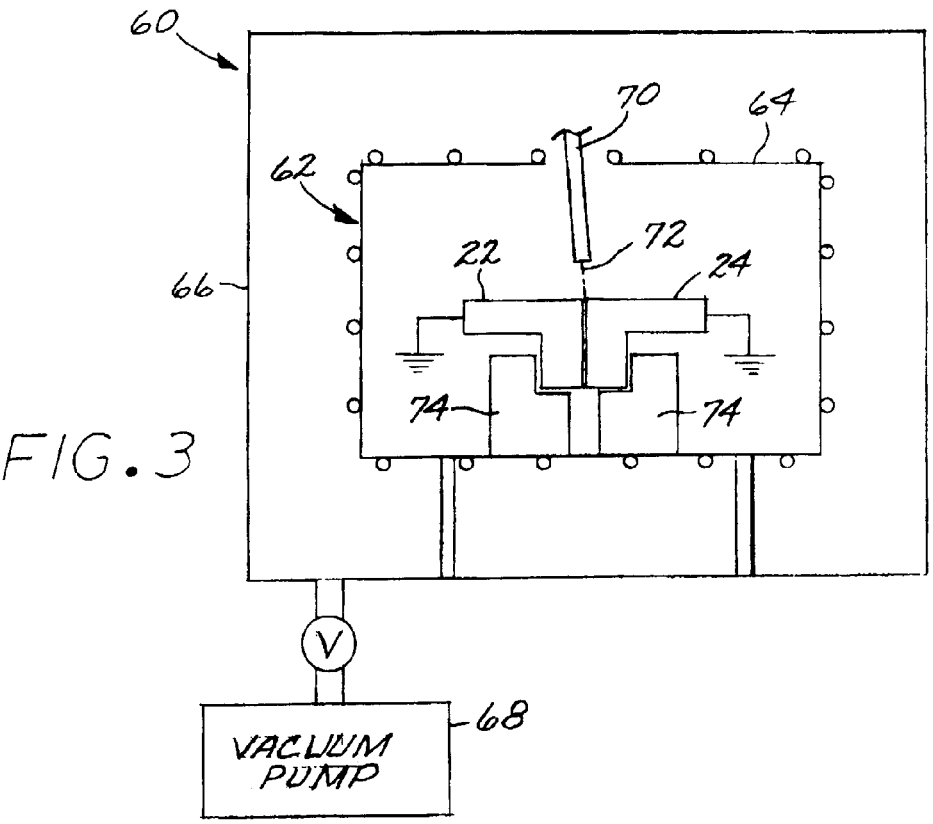
FIG. 3 is a schematic illustration of a welding apparatus.

A welding apparatus 60 is provided, numeral 42. FIG. 3 schematically depicts a preferred form of the welding apparatus 60. The welding apparatus 60 includes a preheating device 62, preferably an oven 64, inside an electron beam vacuum chamber 66. Other preheating devices 62 such as lamps may instead or additionally be used. The electron beam vacuum chamber 66 is controllably evacuated by a vacuum pump 68 operating through a vacuum valve. An electron beam welding gun 70 is positioned inside the vacuum chamber 66 in a position to direct into the interior of the oven 64 an electron beam 72 suitable for welding. The two articles 22 and 24 are positioned inside the oven 64, preferably supported on tooling 74 that holds the articles 22 and 24 in the required positions for subsequent welding. The vacuum pump 68 is turned on, and the interior of the vacuum chamber 66 and the articles 22 and 24 are pumped to a preheating vacuum, typically less than about $10^{-4}$ torr.

The articles 22 and 24 are thereafter preheated to a welding temperature of from about 1700° F. to about 2100° F., step 44, while maintaining the preheating vacuum. The welding temperature is preferably about 1800° F. Preferably, the two articles 22 and 24 are placed into the preheating device 62 at room temperature, and the preheating device 62 is heated to bring the articles 22 and 24 to the preheating temperature. Prior to any welding, the articles 22 and 24 are maintained at the welding temperature for a sufficient time to equilibrate the temperature throughout the two articles 22 and 24 at the welding temperature. In a typical case, this heating period is at least about 2 hours.

Figure 4:
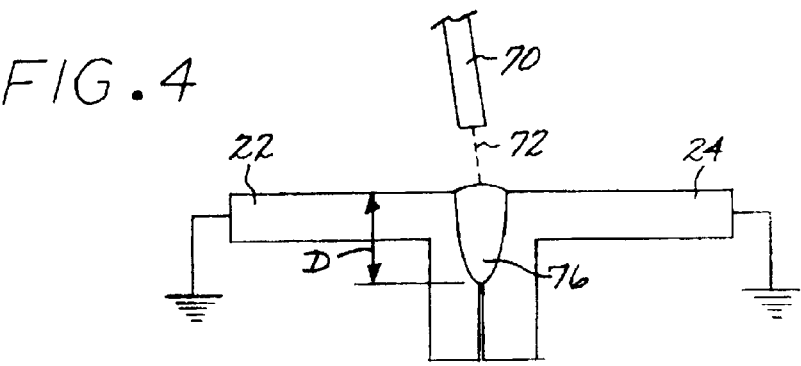
FIG. 4 is a schematic elevational view of the welding operation in process.

The two articles 22 and 24 are thereafter electron beam welded together, step 46, at the welding temperature and in a welding vacuum, which is typically the same vacuum as the preheating vacuum and less than about $10^{-4}$ torr, to form a welded structure. Electron beam welding is known in the art for other applications. FIG. 4 depicts the articles 22 and 24 during the welding step 46. The articles 22 and 24 are grounded, and the electron beam 72 locally heats the articles 22 and 24 in the heated area 76 where they are to be joined. The welding is preferably accomplished by a deep-penetration weld, so that the heated area 76 eventually extends through the entire thickness of the article 22 at the location where the articles 22 and 24 are joined. The final weldment 26 may extend through the entire thickness of the article, or only through a portion, the former illustrated in FIG. 1 and the latter illustrated in FIG. 4. But in this preferred embodiment it is a deep-penetration weld extending to a penetration depth D of at least about 0.3 inches below the surface and into the articles. That is, the welding is not a shallow surface weld of the type used to repair casting defects and is usually less than about 0.3 inches deep.

After the welding is complete, the welded structure is annealed, step 48, at an annealing temperature of from about 1800° F. to about 2200° F., to form the joined structure 20. The annealing temperature is preferably about 2000° F. The annealing step 48 is preferably accomplished in the preheating device 62, by continuing to heat the welded structure after the welding step 46 is completed and with the same welding vacuum. The annealing time is preferably at least about 1 hour, is more preferably at least about 4 hours, and is most preferably from about 1 to about 6 hours. The annealing step 48 is desirably for a time of at least about 2 hours in the illustrated case of the welding of exhaust flap nozzles.

The present approach has been practiced and found to be fully operable to make sound deep-penetration welds at depths up to 6 inches to join Ti-48Al-2Cr-2Nb gamma titanium aluminide components of subscalle exhaust nozzle flaps and other applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for welding two gamma titanium aluminide articles together, comprising the steps of
providing two articles, each made of gamma titanium aluminide material; thereafter
preheating the two articles to a welding temperature of from about 1700° F. to about 2100° F.; thereafter electron beam welding the two articles together at the welding temperature and in a welding vacuum to form a welded structure; and thereafter annealing the welded structure at an annealing temperature of from about 1800° F. to about 2200° F., to form a joined structure.

2. The method of claim 1, wherein the step of preheating includes the step of preheating the two articles in a preheating vacuum.

3. The method of claim 1, wherein the step of preheating includes the step of preheating the two articles to the welding temperature of about 1800° F.

4. The method of claim 1, wherein the step of annealing includes the step of annealing the two articles in an annealing vacuum.

5. The method of claim 1, wherein the step of annealing includes the step of annealing the welded structure at the annealing temperature of about 2000° F.

6. The method of claim 1, wherein the step of annealing includes the step of annealing the welded structure at the annealing temperature for a time of at least about 2 hours.

7. The method of claim 1, wherein the step of annealing includes the step of fabricating the joined structure as a component of a gas turbine engine.

8. The method of claim 1, wherein the method includes an additional step of providing a preheating device inside an electron beam vacuum chamber, and wherein the step of preheating includes the steps of placing the two articles in the preheating device at room temperature, and evacuating the electron beam vacuum chamber, prior to heating of the two articles to the welding temperature.

9. The method of claim 1, wherein the step of providing two articles includes the step of providing at least one of the two articles that is at least about 0.5 inch thick, and wherein the step of electron beam welding includes the step of electron beam welding the two articles through their entire thicknesses.

10. The method of claim 1, wherein the step of electron beam welding includes the step of forming a deep-penetration weld wherein a depth of the weldment is at least about 0.3 inches.

11. A method for welding two gamma titanium aluminide articles together, comprising the steps of providing two articles, each made of gamma titanium aluminide material; thereafter preheating the two articles from room temperature to a welding temperature of from about 1700° F. to about 2100° F. in a preheating vacuum and maintaining the articles at the welding temperature for a time sufficient to thermally equilibrate the two articles; thereafter electron beam welding the two articles together at the welding temperature and in a welding vacuum to form a welded structure; and thereafter annealing the welded structure at an annealing temperature of from about 1800° F. to about 2200° F. in an annealing vacuum and for a time of at least about 2 hours, to form a joined structure that is a component of a gas turbine engine.

12. The method of claim 11, wherein the method includes an additional step of providing a preheating device inside an electron beam vacuum chamber, and wherein the step of preheating includes a step of placing the two articles in the preheating device at room temperature.

13. The method of claim 11, wherein the step of preheating includes the step of preheating the two articles to the welding temperature of about 1800° F.

14. The method of claim 11, wherein the step of annealing includes the step of annealing the welded structure at the annealing temperature of about 2000° F.

15. The method of claim 11, wherein the method includes an additional step of providing a preheating device inside an electron beam vacuum chamber, and wherein the step of preheating includes the steps of placing the two articles in the preheating device at room temperature, and evacuating the electron beam vacuum chamber, prior to any heating of the two articles to the welding temperature.

16. The method of claim 11, wherein the step of providing two articles includes the step of providing at least one of the two articles that is at least about 0.5 inch thick, and wherein the step of electron beam welding includes the step of electron beam welding the two articles through their entire thicknesses.

17. The method of claim 11, wherein the step of electron beam welding includes the step of forming a deep-penetration weld wherein a depth of the weldment is at least about 0.3 inches.

\* \* \* \* \*